(12) United States Patent
Fukuma (10) Patent No.: US 8,017,275 B2
(45) Date of Patent: Sep. 13, 2011

(54) FUEL CELL SYSTEM

(75) Inventor: Kazunori Fukuma, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 499 days.

(21) Appl. No.: 12/331,231

(22) Filed: Dec. 9, 2008

(65) Prior Publication Data

US 2009/0155092 A1 Jun. 18, 2009

(30) Foreign Application Priority Data

Dec. 12, 2007 (JP) .................. 2007-320911

(51) Int. Cl.
*H01M 8/06* (2006.01)
(52) U.S. Cl. .................. 429/415; 417/178; 417/182
(58) Field of Classification Search .................. 429/415, 429/408; 417/165, 178, 182, 187–189
See application file for complete search history.

(56) References Cited

U.S. PATENT DOCUMENTS

| | | | |
|---|---|---|---|
| 6,434,943 B1 * | 8/2002 | Garris | 417/178 |
| 6,706,438 B2 * | 3/2004 | Sahoda et al. | 429/512 |
| 6,729,158 B2 * | 5/2004 | Sakai et al. | 62/500 |
| 6,858,340 B2 * | 2/2005 | Sugawara et al. | 429/443 |
| 7,309,537 B2 * | 12/2007 | Blaszczyk et al. | 429/415 |
| 2005/0064255 A1 * | 3/2005 | Blaszczyk et al. | 429/19 |
| 2005/0147863 A1 * | 7/2005 | Hiramatsu et al. | 429/34 |
| 2006/0216155 A1 * | 9/2006 | Fukuma et al. | 417/65 |
| 2007/0163649 A1 * | 7/2007 | Yamagishi et al. | 429/34 |
| 2009/0317691 A1 * | 12/2009 | Yamada et al. | 429/34 |
| 2010/0099009 A1 * | 4/2010 | Adams et al. | 429/39 |
| 2010/0209818 A1 * | 8/2010 | Fukuma et al. | 429/513 |
| 2010/0209819 A1 * | 8/2010 | Fukuma et al. | 429/513 |

FOREIGN PATENT DOCUMENTS

| | | |
|---|---|---|
| JP | 2002-56869 | 2/2002 |
| JP | 2002-227799 | 8/2002 |
| JP | 2004-44411 | 2/2004 |

OTHER PUBLICATIONS

Japanese Office Action for Application No. 2007-320911, dated Dec. 22, 2009.

* cited by examiner

*Primary Examiner* — Peter Macchiarolo
(74) *Attorney, Agent, or Firm* — Nelson Mullins Riley & Scarborough LLP; Anthony A. Laurentano (57) ABSTRACT

An ejector is provided with a first fluid chamber into which hydrogen gas is introduced; a rod-shaped needle; a nozzle exhausting hydrogen gas introduced into the first fluid chamber from an exhaust port; a second fluid chamber into which hydrogen off-gas is introduced; a diffuser provided at the exhaust port of the nozzle; and a third fluid chamber into which air is introduced. The first fluid chamber is provided between the second fluid chamber and the third fluid chamber. The first diaphragm 65 separates the first fluid chamber and the second fluid chamber and the second diaphragm separates the first chamber and the third fluid chamber. Then, the needle and the nozzle moves to approach each other by the pressure of air introduced into the third fluid chamber and isolate each other by the pressure of hydrogen off-gas introduced into the second fluid chamber.

6 Claims, 5 Drawing Sheets

FIG. 5

FUEL CELL SYSTEM

This application is based on and claims the benefit of priority from Japanese Patent Application No. 2007-320911, filed on 12 Dec. 2007, the content of which is incorporated herein by reference.

BACKGROUND OF THE INVENTION

1. Field of the Invention

The present invention relates to a fuel cell system. In particular, it relates to a fuel cell system mounted to an automobile.

2. Related Art

In recent years, a fuel cell system gains a spotlight as a new power source of an automotive vehicle. For example, a fuel cell system is provided with a fuel cell producing electric power from chemical reaction of reactive gas, a reactive gas supply device supplying reactive gas to the fuel cell through a reactive gas channel, and a control device controlling this reactive gas supply device.

For example, the fuel cell consists of a plurality, e.g., tens or hundreds, of stacked cells. Each of the cells is configured so that a pair of separators sandwiching a membrane electrode assembly (MEA) which consists of two electrodes, which are an anode (positive) electrode and a cathode (negative) electrode, and a solid polymer electrolyte membrane sandwiched by these electrodes.

Supplying hydrogen gas and oxygenated air to the anode electrode and the cathode electrode of the fuel cell, respectively, causes electrochemical reaction to generate electric power.

By the way, in the above-mentioned fuel cell system, hydrogen gas is supplied from the hydrogen tank to the fuel cell, and hydrogen off-gas is discharged from the fuel cell. Since the amount of hydrogen is contained in hydrogen gas supplied from the hydrogen tank is more than that of hydrogen necessary for power generation, excess hydrogen is contained in the exhausted hydrogen off-gas from the fuel cell. Then, hydrogen off-gas is collected by using a circulation unit to be supplied to the fuel cell, together with hydrogen gas from the hydrogen tank.

This circulation unit needs no external power source and uses an ejector utilizing pressure energy, in many cases. For example, the ejector is provided with a housing, a needle provided in this housing to be capable of moving forward and backward, and an approximately cylindrical nozzle provided in the housing to accommodate the needle (see Japanese Published Unexamined Patent Application Publication No. 2002-227799).

Hydrogen gas from the hydrogen tank is introduced into the nozzle, and hydrogen off-gas is introduced into the exhaust port of the nozzle. In addition, an air extreme pressure introducing chamber, into which signal pressure is introduced, is provided at the bottom end side of the needle. A fuel extreme pressure introducing chamber is provided adjacent to this air extreme pressure introducing chamber, and hydrogen off-gas as back pressure is introduced into this fuel extreme pressure introducing chamber through a pipe. A first diaphragm separates the air extreme pressure introducing chamber and the inside of the nozzle. A second diaphragm separates the air extreme pressure introducing chamber and the fuel extreme pressure introducing chamber.

According to this ejector, the needle moves forward and backward according to the differential pressure between the air extreme pressure introducing chamber and the fuel extreme pressure introducing chamber to adjust the flows of hydrogen off-gas to be collected and hydrogen gas to be supplied to fuel cell.

However, in the structure described in the above-mentioned patent application, pressure fluctuation is propagated to the air extreme pressure introducing chamber through the first diaphragm when the pressure of hydrogen gas introduced from the hydrogen tank fluctuates. Accordingly, there has been a problem that signal pressure to be introduced into the air introducing chamber also fluctuates, resulting in that the flow of hydrogen gas to be supplied from the ejector to the fuel cell fluctuates. Therefore, it is necessary to provide with a regulator controlling the pressure of hydrogen gas to be introduced into the ejector.

An object of the present invention is to provide an ejector capable of maintaining the constant flow of gas to be delivered even if the pressure of introduced gas fluctuates.

SUMMARY OF THE INVENTION

An ejector of the present invention (for example, an ejector 50) comprises, a first fluid chamber (for example, a first fluid chamber 63) into which the first gas (for example, hydrogen gas from a hydrogen tank 22) is introduced; a rod-shaped needle (for example, a needle 70); a nozzle (for example, a nozzle 80) accommodating the needle inside thereof and circulating the first gas introduced into a first fluid chamber in a space with the needle and then exhausting first gas from an exhaust port (for example, an exhaust port 84); a second fluid chamber (for example, a second fluid chamber 62) provided at the top end side of the nozzle, into which second gas (for example, hydrogen off-gas from a hydrogen reflux channel 45) is introduced; a diffuser (for example, a diffuser 93) increasing the flow rate of the first gas exhausted from the nozzle to deliver the exhausted first gas and then aspirating the second gas introduced into the second fluid chamber according to the negative pressure of the delivered first gas to merge the second gas with the delivered first gas; and a third fluid chamber (for example, a third fluid chambers 64) provided at the bottom end side of the nozzle, into which third gas (for example, air from an air branch channel 411) is introduced, wherein the top end of the needle and the exhaust port of the nozzle move relatively by using the pressure of the third gas introduced into the third fluid chamber to change the opening area of the exhaust port thereby to adjust the flow of the first gas to be exhausted from the nozzle the first fluid chamber is provided between the second fluid chamber and the third fluid chamber, the first fluid chamber and the second fluid chamber are separated by a first diaphragm (for example, a first diaphragm 65) the first fluid chamber and the third fluid chamber are separated by a second diaphragm (for example, a first diaphragm 66), the needle and the nozzle moves to approach each other by the pressure of the third gas introduced into the third fluid chamber, and the needle and the nozzle moves to isolate each other by the pressure of the second gas introduced into the second fluid chamber.

According to the present invention, the first fluid chamber is provided between the second fluid chamber and the third fluid chamber. In addition, the first diaphragm separates the first fluid chamber and the second fluid chamber and the second diaphragm separates the first fluid chamber and the third fluid chamber. Then, the needle and the nozzle moves to approach each other by the pressure of the third gas and isolate each other by the pressure of the second gas.

Accordingly, pressure fluctuation is propagated to the second and the third fluid chambers through the diaphragms formed at both sides of the first fluid chamber when the pressure of the first gas fluctuates. Thus, the pressure fluctuation affects the second gas introduced into the second fluid chamber and the third gas introduced into the third fluid chamber, but the directions in which the needle and the nozzle move relatively are opposite, whereby the effect of this pressure fluctuation on the second and the third gases is offset. Thus, the force in which the nozzle and the needle move relatively depends on only the differential pressure between the second fluid chamber and the third fluid chamber. Therefore, the constant flow of gas to be delivered from the ejector can be maintained. In the result, it is unnecessary to provide with a regulator controlling the pressure of the first gas introduced into the first fluid chamber.

In this case, it is preferable that the above-mentioned ejector supplies anode gas (for example, hydrogen gas) to a fuel cell (for example, a fuel cell 10) generating electric power by chemically reacting anode gas with cathode gas (for example, air), wherein the delivering port (for example, a delivering port 61) of the diffuser connects with the fuel cell, anode gas as the first gas from an anode supply source (for example, a hydrogen tank 22) is introduced into the first fluid chamber, anode off-gas as the second gas discharged from the fuel cell is introduced into the second fluid chamber, and cathode gas as the third gas is introduced into the third fluid chamber.

Conventionally, hydrogen off-gas is introduced into the bottom end side of the needle as back pressure by using a pipe. However, hydrogen off-gas contains water generated in the fuel cell, so that the contained water may freeze in the pipe, causing the performance of the ejector to deteriorate.

However, according to this invention anode off-gas introduced into the second fluid chamber at the top end side of the nozzle is not introduced into the bottom end side of the nozzle, so that the performance of the ejector can be prevented from deteriorating even if the water contained in anode off-gas freezes.

In this case, it is preferable that the ejector is further provided with a gas shutoff means (for example, a rubber seal 86) provided between the inside wall face of the nozzle and the outside wall face of the needle, wherein the gas shutoff means shuts the space between the needle and the nozzle when the pressure of the third gas introduced into the third fluid chamber is less than the predetermined value.

In a conventional fuel cell vehicle, an anode gas supply channel is provided with a shutoff valve requiring to be shut whenever the vehicle stops, in order to prevent damage in the fuel cell caused by the pressure of the anode gas.

However, according to the present invention, the gas shutoff means shuts the space between the needle and the nozzle when the fuel cell vehicle stops and then the pressure of the third gas is less than the predetermined value. Thus, the pressure at the downstream side of the ejector decreases, and then the pressure in the fuel cell decreases. Therefore, damage in the fuel cell can be prevented automatically, so that the shutoff valve can be removed.

According to the present invention, pressure fluctuation is propagated to the second and the third fluid chambers through the diaphragms formed at both sides of the first fluid chamber when the pressure of the first gas fluctuates. Thus, the pressure fluctuation affects the second gas introduced into the second fluid chamber and the third gas introduced into the third fluid chamber, but the directions in which the needle and the nozzle move relatively are opposite, whereby the effect of this pressure fluctuation on the second and the third gases is offset. Thus, the force to move the nozzle and the needle relatively depends on only the differential pressure between the second fluid chamber and the third fluid chamber. Therefore, the constant flow of gas to be delivered from the ejector can be maintained.

DETAILED DESCRIPTION OF THE INVENTION

Hereinafter, embodiments of the present invention are described with reference to the drawings.

Figure 1:
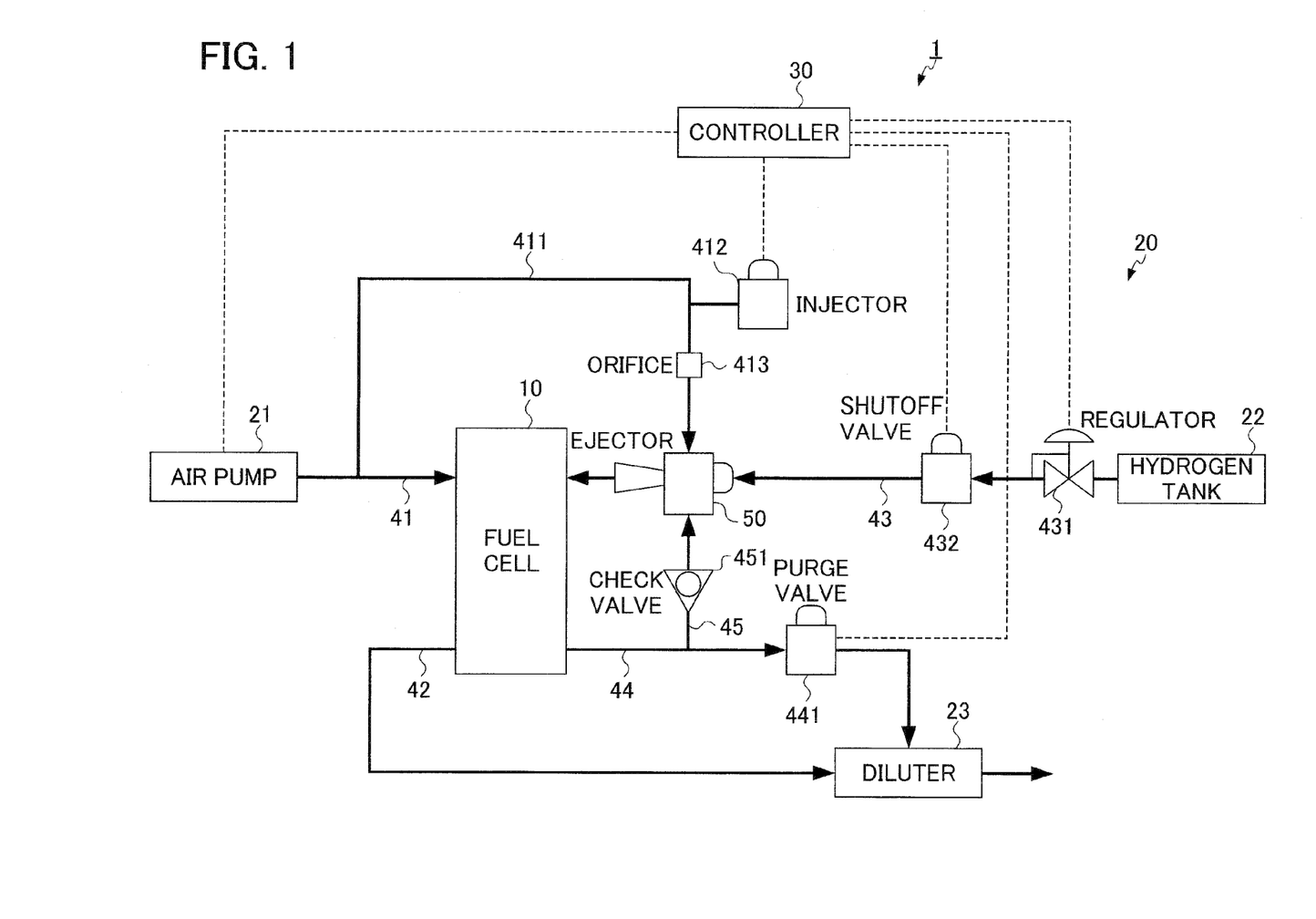
FIG. 1 is a block diagram illustrating a fuel cell system employing an ejector according to one embodiment of the present invention.

FIG. 1 is a block diagram illustrating a fuel cell system 1 employing an ejector according to one embodiment of the present invention.

The fuel cell system 1 is mounted to a vehicle and provided with a fuel cell 10 producing power by reacting reactive gas, a supply device 20 supplying hydrogen gas and air to the fuel cell 10, and a controller 30 controlling the fuel cell 10 and the supply device 20.

Such the fuel cell 10 generates electric power by electrochemical reaction caused by supplying hydrogen gas as anode gas to the anode (positive) electrode side and oxygenated air as cathode gas to a cathode (negative) electrode side.

The supply device 20 is configured to include an air pump 21 supplying air to the cathode electrode side of the fuel cell 10, a hydrogen tank 22 as the hydrogen gas supply source and an ejector 50 that supply hydrogen gas to the anode electrode side thereof, and a diluter 23 processing gas discharged from the fuel cell 10.

The air compressor 21 connects with the cathode electrode side of the fuel cell 10 through an air supply channel 41.

The air supply channel 41 branches along the way, and the branched channel is an air branch channel 411 connecting with the ejector 50.

The air branch channel 411 is provided with an injector 412 adjusting the pressure of air in the air branch channel 411 by exhausting air from the air branch channel 411, and an orifice 413.

The cathode electrode side of the fuel cell 10 connects with an air discharge channel 42 along which the diluter 23 is provided.

The hydrogen tank 22 connects with the anode electrode side of the fuel cell 10 through a hydrogen supply channel 43.

The hydrogen supply channel 43 is provided with a regulator 431, a shutoff valve 432, and an ejector 50, starting from the upstream thereof.

The anode electrode side of the fuel cell 10 connects with a hydrogen discharge channel 44 connecting with the diluter 23. This hydrogen discharge channel 44 is provided with a purge valve 441. The hydrogen discharge channel 44 branches into a hydrogen reflux channel 45 at a side closer to the fuel cell 10 than the purge valve 441, and this hydrogen reflux channel 45 connecting with the ejector 50. In addition, the hydrogen reflux channel 45 is provided with a check valve 451 preventing hydrogen gas being refluxed.

By opening this purge valve 441, hydrogen in the hydrogen discharge channel 44 flows into the diluter 23 and then is diluted with air in the air discharge channel 42.

The ejector 50 collects hydrogen off-gas discharged from the fuel cell 10 to the hydrogen discharge channel 44 through the hydrogen reflux channel 45 to reflux the hydrogen off-gas to the hydrogen supply channel 25. At this point, the ejector 50 adjusts the flow of hydrogen collected from the hydrogen reflux channel 45 based on the pressure of air introduced from the air branch channel 411.

The controller 30 controls the supply device 20 to have the fuel cell 10 generate electric power. At this point, the controller 30 also controls an injector 412 to adjust the flow of hydrogen gas to be collected from the hydrogen reflux channel 45.

Specifically, in order to increase the flow of hydrogen gas to be collected from the hydrogen reflux channel 45, the controller 30 decreases the exhaust amount of air from the injector 412 to increase the pressure of air to be introduced into the ejector 50. On the other hand, in order to decrease the flow of hydrogen gas to be collected from the hydrogen reflux channel 45, the controller 30 increases the exhaust amount of air from the injector 412 to decrease the pressure of air to be introduced into the ejector 50.

More specifically, the controller 30 controls to have the fuel cell 10 generate electric power.

That is, the shutoff valve 432 opens while the purge valve 441 closes. Then, air is supplied to the cathode side of the fuel cell 10 through the air supply channel 41 by driving the air pump 21. At the same time, hydrogen gas is supplied from the hydrogen tank 22 to the anode side of the fuel cell 10 through the hydrogen supply channel 43.

Hydrogen gas and air supplied to the fuel cell 10 are used for producing electric power, and then flow from the fuel cell 10 to the hydrogen discharge channel 44 and air discharge channel 42 respectively, along with residual water generated at the anode side. At this time, since the purge valve 441 closes, hydrogen gas flown to the hydrogen discharge channel 44 is refluxed to the hydrogen supply channel 43 through the hydrogen reflux channel 45 to be reused.

At this point, a part of air supplied from the air pump 21 flows into the air branch channel 411. The pressure of air flowing into the ejector 50 through the air branch channel 411 changes to adjust the flow of hydrogen gas to be collected by adjusting the amount of air exhausted from the injector 412.

Then, hydrogen gas discharged into the hydrogen discharge channel 44 flows into the diluter 23 by opening the purge valve 441 at an appropriate degree. Hydrogen gas flown into this diluter 23 is diluted therein with air circulating the air discharge channel 42 and then discharged outside.

Figure 2:
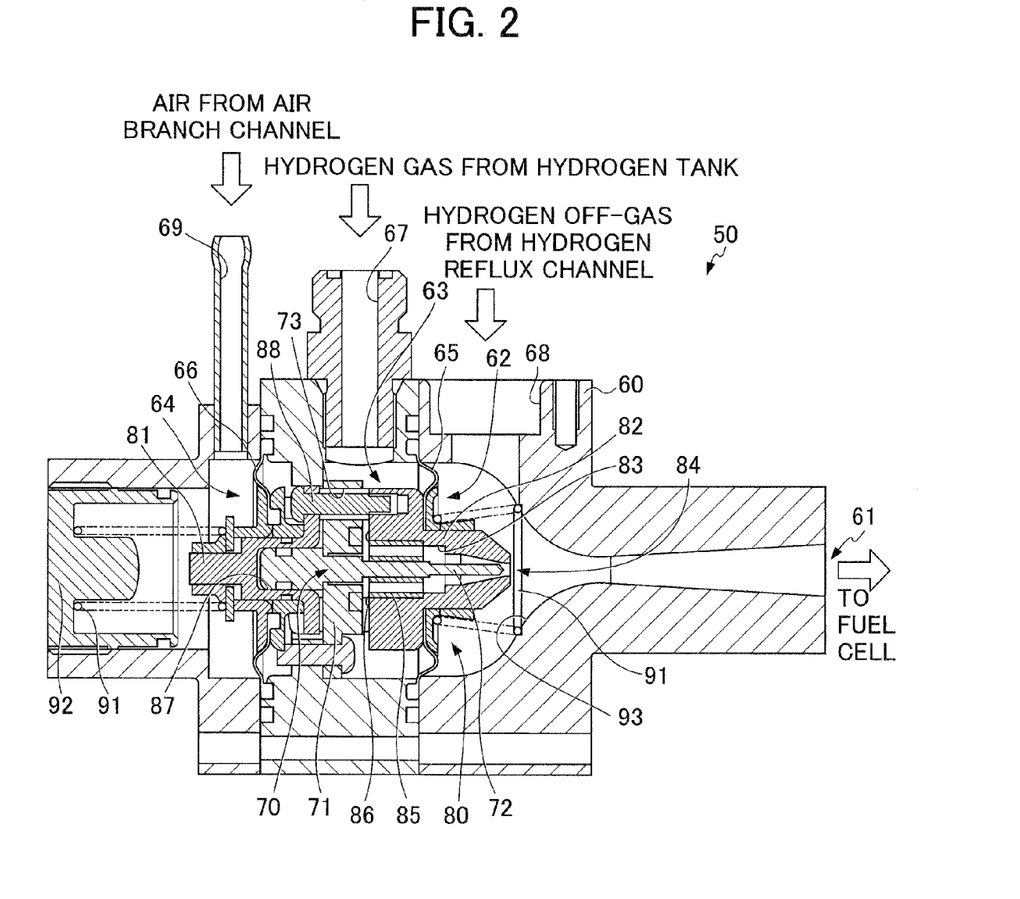
FIG. 2 is a sectional view illustrating the structure of the ejector according to the above-mentioned embodiment.

FIG. 2 is a sectional view illustrating the structure of the ejector 50. The ejector 50 is provided with a housing 60, a needle 70 fixed in this housing 60, and an approximately cylindrical nozzle 80 accommodating this needle.

The needle 70 is provided with a discoid support part 71 supported at the inside wall face of the housing 60, a rod-shaped needle main body 72 projecting from this support part and extending along the direction in which the housing is extruded. A communication hole 73 is formed through the support part 71.

The nozzle 80 is provided with a bottom end part 81 provided at the bottom end side of the needle 70, a top end part 82 provided at the top end side of the needle 70, and a connecting pin 88 connecting the bottom end part 81 and the top end part 82. The connecting pin 88 is inserted through the communication hole 73 formed through the support part 71 of the needle 70.

A through-hole 83 extending along the direction in which the housing is extruded is formed at the top end part 82, and the top end face of this through-hole 83 forms an exhaust port 84. In addition, the internal diameter of this through-hole 83 is smaller as it closer to the exhaust port 84. In addition, the bottom end side of this through-hole 83 is provided with a cylindrical shaft 85.

The bottom end face of top end part 82 of the nozzle 80 is provided with a rubber seal 86 as the gas shutoff means.

On the other hand, a concave part 87 is formed at the bottom end part 81.

The top end side of the needle main body 72 is inserted through the through-hole 83 of the top end part 82, and supported by the shaft 85. On the other hand, the bottom end side of the needle main body 72 is engaged with the concave part 87 of the bottom end part 81.

Thus, the needle 70 is accommodated in the nozzle 80 to maintain the nozzle 80 to be capable of moving forward and backward coaxially with the needle 70. That is, the top end of needle 70 and the exhaust port 84 of the nozzle 80 are capable of moving forward and backward.

According to the above-mentioned needle 70 and the nozzle 80, gas introduced into between the bottom end part 81 and the top end part 82 of the nozzle 80 circulates in a space between the top end part 82 of the nozzle 80 and the needle main body 72 and then is exhausted from the exhaust port 84 of the nozzle 80.

The housing 60 is approximately cylindrical, and a delivering port 61 is formed at the top end face of this housing 60. This delivering port 61 connects with the fuel cell 10 through the hydrogen supply channel 43.

In addition, the housing 60 is provided with a spring 91 biasing the nozzle 80 to maintain the relative position between the nozzle 80 and the needle 70 and an adjusting screw 92 screwed at the bottom end face of the housing 60 to adjust the biasing force of this spring 91.

The space between the outside wall face of the nozzle 80 and the inside wall face of the housing 60 is partitioned into a second fluid chamber 62 located at the top end side of the nozzle 80, a first fluid chamber 63 located at the center part of the nozzle 80, and a third fluid chambers 64 located at the bottom end side of the nozzle 80. That is, the first fluid chamber 63 is provided between the second fluid chamber 62 and the third fluid chamber 64.

The first diaphragm 65 separates the first fluid chamber 63 and the second fluid chamber 62. This first diaphragm 65 is formed between the top end part 82 of the nozzle 80 and the inside wall face of the housing 60.

The second diaphragm 66 separates the first fluid chamber 63 and the third fluid chamber 64. This second diaphragm 66 is formed between the bottom end part 81 of the nozzle 80 and the inside wall face of the housing 60.

That is, the first fluid chamber 63 is partitioned by the first diaphragm 65 and the second diaphragm 66, and provided between the bottom end part 81 and the top end part 82 of the nozzle 80.

In addition, the areas of the first diaphragm 65 and the second diaphragm 66 are the approximately same.

The first communication hole 67 communicating with the first fluid chamber 63, the second communication hole 68 communicating with the second fluid chamber 62, and the third communication hole 69 communicating with the third fluid chamber 64 are formed through the housing 60. The first communication hole 67 connects with the hydrogen tank 22 through the hydrogen supply channel 43, and hydrogen gas as the first gas is introduced from the hydrogen tank 22 to the first fluid chamber 63 through this first communication hole 67. Then, this hydrogen gas introduced into the first fluid chamber 63 is introduced into the nozzle 80, and then exhausted from the exhaust port 84 of the nozzle 80.

The second communication hole 68 connects with the hydrogen reflux channel 45, and hydrogen off-gas as the second gas discharged from the fuel cell 10 is introduced into the second fluid chamber 62 through this second communication hole 68.

The third communication hole 69 connects with the air branch channel 411, and air as the third gas serving as air signal pressure is introduced to the third fluid chamber 64 through this third communication hole 69.

The diffuser 93 is formed at the top end side of the housing 60 and connects with the exhaust port 84 of the nozzle 80. This diffuser 93 is formed so that the internal diameter of the housing 60 narrows rapidly toward the delivering port 61 and then expands gradually.

The diffuser 93 increases the flow rate of hydrogen gas exhausted from the nozzle 80 to deliver the exhausted hydrogen gas from the delivering port 61 and then aspirating hydrogen off-gas introduced into the second fluid chamber 62 according to the negative pressure of the delivered hydrogen gas to merge the hydrogen off-gas with hydrogen gas introduced into the first fluid chamber 63.

Since the third fluid chamber 64 is provided at the bottom end side of the nozzle 80, the nozzle 80 and the needle 70 move to approach each other by air signal pressure introduced into the third fluid chamber 64. On the other hand, since the second fluid chamber 62 is provided at the top end side of the nozzle 80, the nozzle 80 and the needle 70 move to isolate each other by the pressure of hydrogen off-gas introduced into the second fluid chamber 62.

That is, the following expression is true.

$$F = (P_{air} - P_{out}) \times S$$

In the expression, air signal pressure introduced into the third fluid chamber 64 is defined as Pair, the pressure of hydrogen off-gas introduced into the second fluid chamber is defined as Pout, the area of the first diaphragm 65 and the second diaphragm 66 is defined as S, and the biasing force of the spring 91 retreating the nozzle 80 is defined as F.

Therefore, the relative position of the nozzle 80 and the needle 70 is determined by the biasing force of the spring 91. Then, the relative position of the top end of needle 70 and the exhaust port 84 of the nozzle 80 changes according to the differential pressure between the second fluid chamber 62 and the third fluid chamber 64. As a result, the opening area of the exhaust port 84 changes to adjust the flow of hydrogen gas to be exhausted from the exhaust port 84.

The operation of the above-mentioned ejector 50 is described below.

Figure 3:
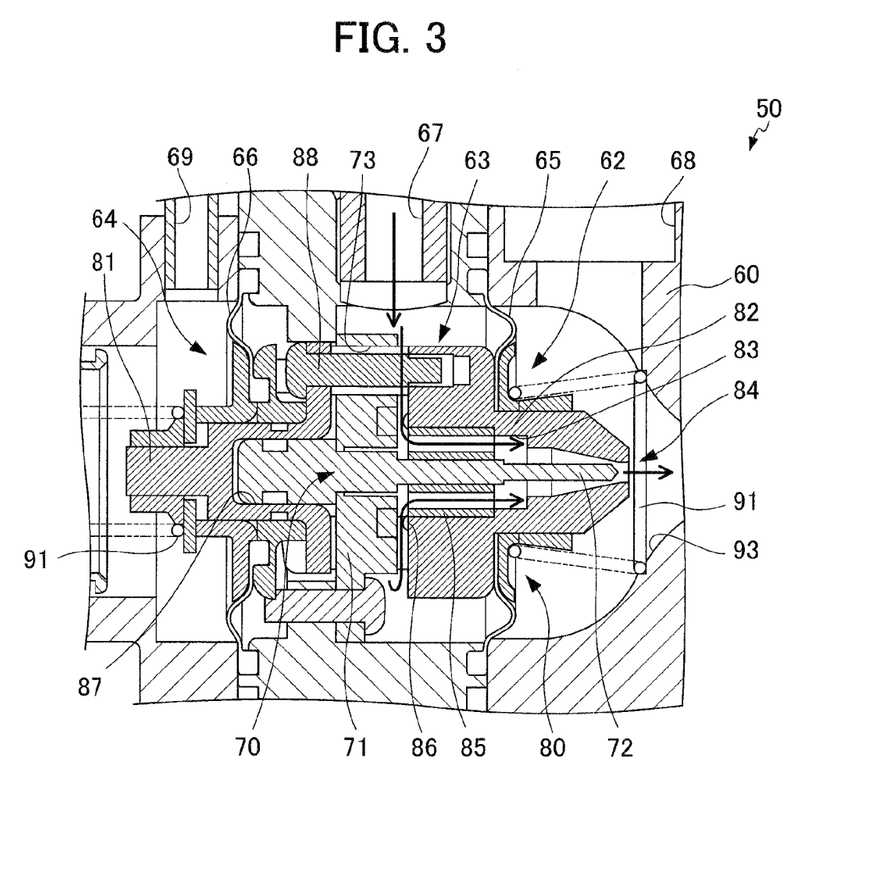
FIG. 3 is a sectional view illustrating the operation of the ejector according to the above-mentioned embodiment when the pressure of the third gas is more than a predetermined value.

When air signal pressure introduced into the third fluid chamber 64 is higher than the predetermined, in this case, the pressure of hydrogen off-gas introduced into the second fluid chamber 62, the nozzle 80 moves forward as shown in FIG. 3.

Then, hydrogen gas introduced into the first fluid chamber 63 is introduced into the nozzle 80, circulates the space between the top end part 82 of the nozzle 80 and the needle main body 72, and then exhausted from the exhaust port 84 of the nozzle 80. Hydrogen gas exhausted from the nozzle 80 is delivered from the delivering port 61 at a flow rate increased by the diffuser 93. Hydrogen off-gas introduced into the second fluid chamber 62 is aspirated according to the negative pressure of the delivered first gas to merge the hydrogen off-gas with hydrogen gas introduced into the first fluid chamber 63.

At this point, the opening area of the exhaust port 84 of the nozzle 80 increases when air signal pressure introduced into the third fluid chamber 64 increases. As a result, the flow of hydrogen gas to be exhausted from the nozzle 80 increases, and the flow of hydrogen off-gas to be aspirated by the negative pressure of this hydrogen gas also increases. On the other hand, the opening area of the exhaust port 84 of the nozzle 80 decreases when air signal pressure introduced into the third fluid chamber 64 decreases. As a result, the flow of hydrogen gas to be exhausted from the nozzle 80 decreases, and the flow of hydrogen off-gas to be aspirated by the negative pressure of this hydrogen gas also decreases.

Figure 4:
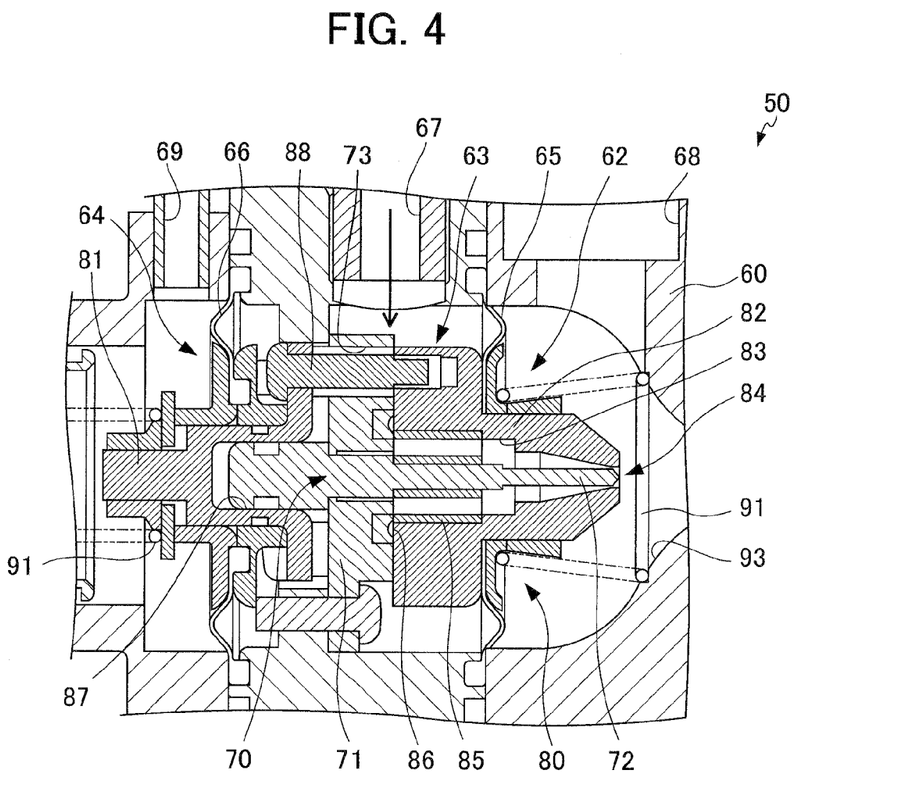
FIG. 4 is a sectional view illustrating the operation of the ejector according to the above-mentioned embodiment when the pressure of the third gas is equal to or less than the predetermined value.

Air signal pressure introduced into the third fluid chamber is equal to or lower than the predetermined value, in this case, the pressure of hydrogen off-gas introduced into the second fluid chamber 62, the nozzle 80 moves backward as shown in FIG. 4. Accordingly, the exhaust port 84 of the nozzle 80 and the top end face of the needle 70 move to approach each other, and the space between the needle 70 and the nozzle 80 is shut with the rubber seal 86. As a result, the flow of hydrogen gas to be exhausted from the nozzle 80 decreases to zero.

The present embodiment has following advantages.

(1) The first fluid chamber 63 is provided between the second fluid chamber 62 and the third fluid chamber 64. In addition, the first diaphragm 65 separates the first fluid chamber 63 and the second fluid chamber 62, and the second diaphragm 66 separates the first fluid chamber 63 and the third fluid chamber 64. Then, the needle 70 and the nozzle 80 move to approach each other by the pressure of air from the air branch channel 411 and isolate each other by the pressure of hydrogen off-gas from the hydrogen reflux channel 45.

Pressure fluctuation is propagated to the second fluid chamber 62 and the third fluid chamber 64 through the diaphragms 65 and 66 formed at both sides of the first fluid chamber 63 when the pressure of hydrogen gas from the hydrogen tank 22 fluctuates. Thus, the pressure fluctuation affects hydrogen off-gas introduced from the hydrogen reflux channel 45 to the second fluid chamber 62 and air introduced from the air branch channel 411 to the third fluid chamber 64, but the directions in which the needle 70 and the nozzle 80 move relatively are opposite, whereby the effect of this pressure fluctuation on the hydrogen off-gas and the air is offset. Accordingly, the force in which the nozzle 70 and the needle 80 move relatively depends on only the differential pressure between the second fluid chamber 62 and the third fluid chamber 64. Therefore, the constant flow of gas to be delivered from the ejector 50 can be maintained. As a result, it is unnecessary to provide with a regulator controlling the pressure of hydrogen gas introduced into the first fluid chamber 63.

(2) Hydrogen off-gas introduced into the second fluid chamber 62 at the top end side of the nozzle 80 is not introduced into the bottom end side of the nozzle 80, so that the performance of the ejector 50 can be prevented from deteriorating even if water contained in hydrogen off-gas freezes.

(3) When the fuel cell vehicle stops, whereby the pressure of air from the air branch channel 411 decreases less than the predetermined value, the space between the needle 70 and the nozzle 80 is shut with the rubber seal 86. Thus, the pressure at the downstream side of the ejector 50 decreases, and the pressure in the fuel cell 10 decreases. Therefore, damage in the fuel cell 10 can be prevented automatically, so that the shutoff valve can be removed.

The present invention is not limited to the above-mentioned embodiments described above, but should be considered to include variation and modifications considered to be within the scope of the present invention insofar as the object of the present invention is achieved.

Figure 5:
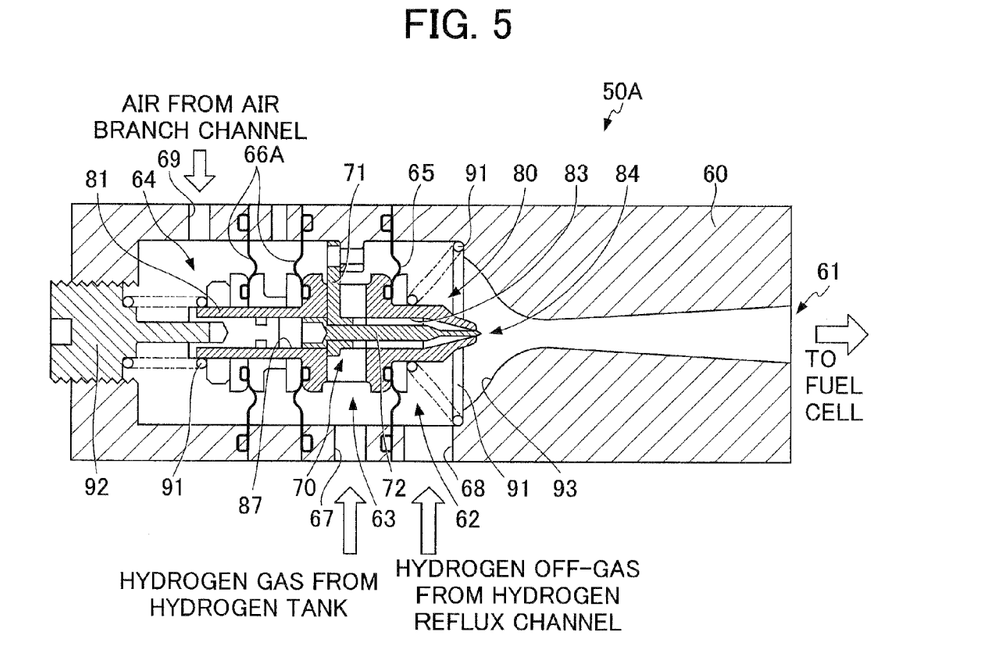
FIG. 5 is a sectional view illustrating an ejector according to a variation of the present invention.

For example, in the present embodiment, one second diaphragm 66 separates the first fluid chamber 63 and the third fluid chamber 64, but not limited thereto. As shown in FIG. 5, the second diaphragms 66A may be doubled to allow a space between these second diaphragms 66A to be open to the atmosphere. According to this structure, the degradation of fuel cell 10 can be prevented without mixing hydrogen gas introduced into the first fluid chamber 63 and air introduced into the third fluid chamber 64 even when any one of the second diaphragms 66A damages.

What is claimed is:

1. An ejector comprising:
    a first fluid chamber into which a first gas is introduced;
    a rod-shaped needle;
    a nozzle accommodating the needle inside thereof and circulating the first gas introduced into a first fluid chamber in a space with the needle and then exhausting the first gas from an exhaust port,
    a second fluid chamber provided at the top end side of the nozzle, into which second gas is introduced,
    a diffuser increasing the flow rate of the first gas exhausted from the nozzle to deliver the exhausted first gas and then aspirating the second gas introduced into the second fluid chamber according to the negative pressure of the delivered first gas to merge the second gas with the delivered first gas; and,
    a third fluid chamber provided at the bottom end side of the nozzle, into which third gas is introduced, wherein
    the top end of the needle and the exhaust port of the nozzle move relatively by using the pressure of the third gas introduced into the third fluid chamber to change the opening area of the exhaust port thereby to adjust the flow of the first gas to be exhausted from the nozzle,
    the first fluid chamber is provided between the second fluid chamber and the third fluid chamber,
    the first fluid chamber and the second fluid chamber are separated by a first diaphragm,
    the first fluid chamber and the third fluid chamber are separated by a second diaphragm,
    the needle and the nozzle moves to approach each other by the pressure of the third gas introduced into the third fluid chamber, and
    the needle and the nozzle moves to isolate each other by the pressure of the second gas introduced into the second fluid chamber.

2. The ejector according to claim 1, wherein the needle is fixed for the diffuser.

3. The ejector according to claim 1, wherein the areas of the first diaphragm and the second diaphragm are the approximately same.

4. An ejector for a fuel cell, supplying anode gas to a fuel cell generating electric power by chemically reacting anode gas with cathode gas, the ejector is the ejector according to claim 1, wherein
    the delivering port of the diffuser connects with the fuel cell,
    anode gas as the first gas from an anode supply source is introduced into the first fluid chamber,
    anode off-gas as the second gas discharged from the fuel cell is introduced into the second fluid chamber, and
    cathode gas as the third gas is introduced into the third fluid chamber.

5. The ejector according to claim 4, further comprising a gas shutoff unit provided between the inside wall face of the nozzle and the outside wall face of the needle, wherein the gas shutoff unit shuts the space between the needle and the nozzle when the pressure of the third gas introduced into the third fluid chamber is less than the predetermined value.

6. The ejector according to claim 4, wherein the second diaphragm is doubled to be open to a space between the doubled second diaphragms to the atmosphere.

* * * * *